Patented Feb. 26, 1952

2,586,863

UNITED STATES PATENT OFFICE 2,586,863

PROCESS OF PRESERVING ARTICHOKES BY FREEZING

Jess Rose, Hollister, Calif., assignor to Artichokes Inc., Watsonville, Calif., a corporation of California No Drawing. Application September 24, 1949, Serial No. 117,720

7 Claims. (Cl. 99—193)

This invention relates to food processing, and more particularly to the preservation of artichokes by low temperature treatment.

In quick freeze processing of vegetables, an important step for preparing the vegetable for the freezing is that of steam blanching the same for a few minutes prior to the freezing step in order to inactivate certain enzymes which if not thus inactivated cause the vegetable to turn black upon freezing and subsequently spoil in a relatively short time. Heretofore, when attempts have been made to process artichokes in this manner, the tough outer layers or scales of the artichoke head prevent the blanching steam from penetrating the same, with the result that the inner portion of such vegetable remains unblanched; and upon freezing, the above described blackening and subsequent spoiling occurs.

This invention has as its objects, among others, the provision of an economical, rapid, and efficacious method for effecting thorough blanching of the well known Globe or Mediterranean artichoke which is a common edible vegetable, in preparation for a subsequent freezing step. Summarizing the invention, it comprises spreading apart the scales of the head of the artichoke prior to freezing and introducing water, preferably warm water, into the artichoke in the spaces between the scales and then steam blanching such vegetable. The artichoke thus serves as a receptacle for the water; and during the steam blanching, the water in the water containing artichoke head is converted to steam with the result that the entire interior of the artichoke as well as exterior become thoroughly blanched, so that it may be subsequently frozen in a conventional manner without blackening and spoiling.

In greater detail, in order to enable the scales of the artichoke head to be readily spread apart so that the artichoke may hold the water, a small portion thereof adjacent the top is trimmed off, by cutting away such portion at a location substantially even with the tips of the long outer scales which extend from the stem of such vegetable to the top thereof. This enables all the scales to be spread apart readily by hand without breaking away from the base of the vegetable. The inside of the artichoke can then be readily filled with as much water as it can hold, to thus cause the water to penetrate substantially all the interstices or spaces between the scales.

Also, to enable the water containing artichoke to stand upright during the blanching so that substantially very little water will drain out, it is desirable and preferable to cut off the stem of the artichoke head square at its base leaving a substantially flat surface upon which the head of the artichoke can be supported. The stem of the artichoke can be cut off prior to trimming of the top, or vice versa, the order being immaterial; and if special supporting means is provided to enable the artichoke to be held upright during the blanching, the stem need not be cut off.

In spreading the scales apart, it is unnecessary to pull them apart widely in or adjacent the heart of the artichoke because these scales are relatively tender, so that when the water containing artichoke is steam blanched, and the water is converted into steam, such converted steam readily blanches the interior of the vegetable including the heart. Preferably, warm water at a temperature of preferably about 140° F. to about 160° F. is employed for introduction into the artichoke because this shortens the blanching period, as less time is required to convert the water into steam. The described temperature of the water is not particularly critical although desirable, as even room temperature tap water may be employed, or water at a temperature higher than 160° F. However, it is undesirable to have the water temperature too high or too low because best results have been obtained when the artichoke holds the water for the time which it takes to convert the water at the preferred temperature range into the steam, as this results in efficacious steam penetration of all the scales and consequently thorough blanching without unduly softening the scales.

The introduction of water into the artichoke is best accomplished by holding the artichoke under a bath of water while simultaneously spreading the scales apart. This effects thorough washing of the artichoke and allows substantially all entrapped air to escape, and also results in the artichoke becoming filled with a maximum quantity of the water. Other ways may be employed for introducing the water into the artichoke, such as holding the same under tap water while spreading the scales apart, or spreading the scales apart beforehand, and then introducing the water. These methods are, however, not as effective in introducing as much water into the artichoke as it can hold.

After introduction into the artichoke of as much of the water as it can hold, the artichoke is next ready for the blanching which is conducted in a conventional steam blanching retort or box wherein the steam is at superatmospheric pressure, at a temperature of preferably about 220° F. to 260° F. For this purpose the artichokes are removed from the impregnating water in upright position, so that very little water can drain out, and are placed and supported upright on any suitable screens or trays which are placed in the steam blanching retort.

They are held in the retort until the water which has been placed in the artichoke is converted into steam so that the entire interior as well as exterior of the vegetable become thoroughly blanched and substantially no liquid water remains in the vegetable. The described blanching temperature range is preferred because it has been found to produce the most efficacious blanching of the artichoke without unduly wilting or otherwise softening the same. The blanching time at the temperature range noted ranges from approximately 15 minutes at 220° F. to approximately 6 minutes at 260° F.

After the blanching, the artichokes are removed from the retort and are placed on fresh trays upon which they are allowed to cool, preferably to substantially room temperature. However, right after being removed from the retort or when they are first placed on the cooling trays, the artichokes are banded for the purpose of holding substantially all the scales together toward the center of the vegetable, so that they cannot fall apart which might otherwise occur because of the softening thereof effected by the blanching step.

The banding can be readily effected by securing a string or other flexible member about the periphery of the artichoke to bring all the scales together substantially tight to the center of the artichoke, as they existed in their fresh state. However, it is more convenient, and preferred to band the artichoke by placing a rubber band about the same, as such banding means can be quickly and readily placed in position, and subsequently removed after freezing of the artichoke. The banding is a relatively important step in preventing loss of scales and providing a desirable appearance to the finally frozen artichoke.

When banded, and after the artichokes have cooled on the trays, they are next ready for quick freezing by a more or less conventional procedure for the quick freezing of vegetables, which comprises placing the artichokes in a freezing chamber to freeze them quickly at a low temperature below freezing, preferably at about 35° to 40° below zero Fahrenheit for about 4 to 5 hours. After the artichokes have been thus frozen, they are removed from the low temperature freezing chamber, and then stored until ready for distribution, in the usual manner employed for other frozen vegetables, namely, in any suitable refrigerated chamber maintained at a temperature from 20° below zero to zero Fahrenheit.

As is customary in the freezing of other vegetables, the artichokes can be packed in paperboard or any other suitable frozen food cartons after they have been banded on the cooling trays, and quickly frozen and stored in the cartons. The consumer can readily remove the bands prior to cooking of the artichokes. They can be cooked in the usual manner employed for other vegetables, namely, in a steamer for about 20 to 30 minutes or in a pressure cooker for about 5 to 6 minutes. The cooked product tastes far better and is far superior in quality than fresh artichokes prepared in the usual way by boiling, as substantially all the flavor, original constituents and vitamins are preserved by the described process.

If desired, the cut off stems of the artichokes can be processed after they have been cut off, by first peeling off the skin and scraping off the outside meat of the stems, and then subjecting the thus treated stems to the blanching and freezing steps previously described, along with the heads of the artichokes from which the stems have been cut. The stems treated in this way make a delicious food product when cooked in the manner previously described. Also, the hearts of the artichokes can be removed, and blanched and frozen in the manner described, along with the remainder of the artichoke heads from which the hearts have been removed to make an extremely delicious product when cooked.

If desired, specially flavored artichokes can be prepared by treating them with other products after they are blanched and before they are frozen. For example, after the artichokes have been blanched and allowed to cool, the scales may be spread apart, and the inside of the artichoke filled with any desired dressing to taste, such as bread crumb dressing, and they may be topped with, for example, grated cheese and paprika. They are then banded and frozen in the manner described. The thus flavored artichoke can be cooked in the manner related.

The following is a specific example illustrating how an embodiment of the invention can be quickly performed in a commercial food processing plant:

The stems of artichokes fresh from the field are first cut off square at the base so that the artichokes can stand upright. Next the tops of the artichokes are cut off adjacent the tips of the outer long scales, so that the scales can be readily spread apart to open up the heads of the artichokes so that they can serve as receptacles or cups for the blanching water with which they are subsequently filled. The spreading apart of the petals is effected under warm water at a temperature of about 145° F. This results in thorough cleaning or washing of the vegetable. When filled with the warm water, the artichokes are removed in upright position so that very little, if any, water will drain out, and placed in upright position on screen trays.

The trays with the artichokes thereon are then blanched under steam in the usual steam box at superatmospheric pressure at a temperature of about 240° F. for about 10 minutes. During blanching, the water in the water filled artichokes is converted to steam resulting in thorough blanching of all the interior artichoke scales as well as the hearts or centers of the artichokes, to inactivate the enzymes which would otherwise cause blackening and spoiling of the artichokes upon freezing thereof.

After the blanching, the artichokes are removed from the steam box and placed on cooling trays, and are then banded by placing a rubber band about the periphery of each artichoke to hold the scales in place tight to the center of the artichoke. Next, the artichokes are allowed to cool to approximately room temperature; and when cooled, they are packaged in suitable cartons and frozen quickly in a freezing chamber at a temperature of about 40° F. below zero for about 4 hours. After such freezing, the packaged artichokes are stored under freezing conditions, in the usual frozen food storage chamber. The ultimate purchaser can prepare the artichokes in the manner previously related.

I claim:

1. The method of processing an artichoke for low temperature preservation which comprises spreading apart scales of the artichoke head whereby the artichoke can serve as a receptacle for water, introducing water into the artichoke, steam blanching such as water containing artichoke, and subsequently freezing the same.

2. The method of processing an artichoke for low temperature preservation which comprises cutting away a portion of the artichoke head adjacent the top thereof, spreading apart scales of the artichoke whereby the artichoke can serve as a receptacle for water, introducing warm water into the artichoke, steam blanching such water containing artichoke in upright position to convert the water in the artichoke to steam and thereby thoroughly blanch the interior of the artichoke, and subsequently freezing the same.

3. The method of processing an artichoke for low temperature preservation, which comprises cutting away a portion of the artichoke head adjacent the top thereof, spreading apart scales of the artichoke whereby the artichoke can serve as a receptacle for water, placing the artichoke under warm water to fill the same with the water, steam blanching such water containing artichoke in upright position and at superatmospheric pressure to convert the water in the artichoke to steam and thereby thoroughly blanch the interior of the artichoke, and subsequently freezing the same.

4. The method of processing an artichoke for low temperature preservation, which comprises cutting off the stem of the artichoke head adjacent its base so that the artichoke head can be supported in upright position, cutting away a portion of the artichoke head adjacent the top thereof, spreading apart scales of the artichoke whereby the artichoke can serve as a receptacle for water, introducing water at a temperature of about 140° F. to about 160° F. into the artichoke, steam blanching such water containing artichoke in upright position and under superatmospheric pressure at a temperature of about 220° F. to about 260° F. for about 15 to 6 minutes to convert the water in the artichoke to steam and thereby thoroughly blanch the interior of the artichoke, and subsequently freezing the same.

5. The method of processing an artichoke for low temperature preservation, which comprises cutting away a portion of the artichoke head adjacent the top thereof, spreading apart scales of the artichoke whereby the artichoke can serve as a receptacle for water, introducing water into the artichoke, steam blanching such water containing artichoke in upright position to convert the water in the artichoke to steam and thereby thoroughly blanch the interior of the artichoke, after the blanching banding the artichoke to hold the scales together, and subsequently freezing the artichoke.

6. The method of processing an artichoke for low temperature preservation which comprises cutting away a portion of the artichoke head adjacent the top thereof while leaving substantially all of the scales of the head otherwise intact, spreading apart scales of the artichoke whereby the artichoke can serve as a receptacle for water, introducing water into the artichoke while allowing substantially all entrapped air to escape blanching said water containing artichoke in an atmosphere of steam to convert the water contained in said artichoke to steam and thereby thoroughly blanch the interior of the artichoke, and subsequently freezing the artichoke.

7. The method of processing an artichoke for low temperature preservation which comprises cutting away a portion of the artichoke head adjacent the top thereof while leaving substantially all of the scales of the head otherwise intact, spreading apart scales of the artichoke whereby the artichoke can serve as a receptacle for water, introducing water into the artichoke while allowing substantially all entrapped air to escape, blanching said water containing artichoke in an atmosphere of steam and in an upright position to convert the water contained in said artichoke to steam and thereby thoroughly blanch the interior of the artichoke, after the blanching banding the artichoke to hold the scales together, and subsequently freezing the artichoke.

JESS ROSE.

REFERENCES CITED

The following references are of record in the file of this patent:

Given, Modern Encyclopedia of Cooking, vol. 2, p. 1428 (1947), J. G. Ferguson and Assoc., Chicago.

Tressler et al., The Freezing Preservation of Foods, pages 311 and 315, (1947), Avi Pub. Co., N. Y. C.